US006992150B2

(12) United States Patent
Nakanishi et al.

(10) Patent No.: US 6,992,150 B2
(45) Date of Patent: Jan. 31, 2006

(54) TONER BINDER AND PROCESS FOR PRODUCING THE SAME

(75) Inventors: Hideo Nakanishi, Kyoto (JP); Tomohisa Kato, Kyoto (JP); Masakazu Iwata, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 377 days.

(21) Appl. No.: 10/220,309

(22) PCT Filed: Mar. 7, 2001

(86) PCT No.: PCT/JP01/01755

§ 371 (c)(1), (2), (4) Date: Sep. 13, 2002

(87) PCT Pub. No.: WO01/69325

PCT Pub. Date: Sep. 20, 2001

(65) Prior Publication Data

US 2003/0040554 A1 Feb. 27, 2003

(30) Foreign Application Priority Data

Mar. 13, 2000 (JP) ............................ 2000-069381

(51) Int. Cl.
*C08L 67/02* (2006.01)
*G03G 9/087* (2006.01)

(52) U.S. Cl. ...................... 525/444; 525/425; 525/437; 525/439; 430/109.1; 430/109.4

(58) Field of Classification Search ................ 525/425, 525/437, 439, 444; 430/109.1, 109.4
See application file for complete search history.

(56) References Cited

U.S. PATENT DOCUMENTS 5,202,212 A 4/1993 Shin et al. .................. 430/109
5,773,183 A * 6/1998 Doujo et al. ............. 430/109.4
5,814,428 A 9/1998 Kido et al. ................. 430/110
6,168,894 B1 * 1/2001 Aoki et al. .................... 430/99
6,344,302 B1 * 2/2002 Kurose et al. ........... 430/108.6
6,506,530 B1 * 1/2003 Kido et al. .............. 430/108.8
6,534,229 B2 * 3/2003 Ohba et al. .............. 430/108.2

FOREIGN PATENT DOCUMENTS

| | | |
|---|---|---|
| EP | 0 974 871 A1 | 1/2000 |
| JP | 60-214368 | 10/1985 |
| JP | 63-225244 | 9/1988 |
| JP | 64-15755 | 1/1989 |
| JP | 4-211272 | 8/1992 |
| JP | 4-313760 | 11/1992 |
| JP | 7-140714 | 6/1995 |
| JP | 8-272138 | 10/1996 |
| JP | 9-104741 | 4/1997 |
| JP | 9-204071 | 8/1997 |
| JP | 9-269612 | 10/1997 |
| JP | 10-246983 | 9/1998 |
| JP | 11-024313 | 1/1999 |
| JP | 11-133660 | 5/1999 |
| JP | 2000-39738 | 2/2000 |
| JP | 2000-56504 | 2/2000 |
| WO | WO 01/69325 A1 | 9/2001 |

* cited by examiner

*Primary Examiner*—Jeffrey B. Robertson
(74) *Attorney, Agent, or Firm*—Westerman, Hattori, Daniels & Adrian, LLP

(57) ABSTRACT

A toner binder for dry toners which comprises a polyester; and a process for producing the toner binder. A known conventional technique for imparting low-temperature fixing property and anti-hot offset property to a toner binder is to use a mixture of two powdery polyesters. However, when the two polyesters mixed differ greatly in softening point, the effect of mixing is not obtained and pigments show poor dispersibility during toner production. The toner binder and the process eliminate these problems. The toner binder comprises aggregates of binder resin particles comprising two polyesters (A) and (B), wherein the polyester (A) has a higher softening point than the polyester (B) and the polyesters (A) and (B) have been evenly mixed in each particle. The process for producing a toner binder is characterized by melt-mixing the two polyesters (A) and (B) at 80 to 180° C. The toner binder is used mainly as an ingredient for dry toners.

20 Claims, No Drawings

TONER BINDER AND PROCESS FOR PRODUCING THE SAME

TECHNICAL FIELD

The invention relates to a toner binder for a dry toner used in electrophotography, electrostatic recording, electrostatic printing and so on, and a method of manufacturing the same.

BACKGROUND ART

It is required that a toner binder used for a dry toner fulfills conflicting performances that the toner can be fixed even at a low hot-roll temperature (low-temperature fixing property) and the toner is not fused to a hot-roll even at a high hot-roll temperature (anti-hot offset property).

Conventionally, styrene-acrylic resin, polyester, epoxy resin and the like are used for toner binders, and a crosslinking polyester has been frequently used by virtue of being excellent in low-temperature fixing property.

In recent years, demanded for a toner binder and toner formed therefrom are a better low-temperature fixing property than before from the viewpoint of energy saving and a better anti-hot offset property from the viewpoint of downsizing of an apparatus such as copying machines and the like.

With a view to improving the low-temperature fixing property and anti-hot offset property of a toner binder of polyester, methods of mixing two polyesters having different molecular weight distributions have been proposed (for example, Japanese Patent Laid-Open No. 214368/1985, Japanese Patent Laid-Open No. 225244/1988, Japanese Patent Laid-Open No. 313760/1992 and soon), and the low-temperature fixing property and anti-hot offset property disclosed in these methods tend to be balanced better than those of conventional polyesters. However, toner binders in the prior art are formed by mixing two polyesters, which are not so much different in softening point, together. Meanwhile, in order to manufacture a toner binder having a better low-temperature fixing property and a better anti-hot offset property, it has been necessary to mix two polyesters, which are much different in softening point, together.

Also, the above-mentioned prior art involves the following problems separately.

More specifically, Japanese Patent Laid-Open No. 214368/1985 describes that a preferred mixing ratio of two polyesters (a, b) is such that (a) is at least 50 percent by weight and (b) is at most 30 percent by weight. Limitation in the mixing ratio has been inconvenient in achieving a better low-temperature fixing property of a toner binder. Japanese Patent Laid-Open No. 225244/1988 describes "It is preferable that the softening point Tsp of the second polyester is lower than a temperature which is 20° C. higher than the softening point Tsp of the first polyester". The allowable range of a difference in softening point is disadvantageously too small to manufacture a toner binder having a better low-temperature fixing property and a better anti-hot offset property. Further, in the Laid-Open publication, the object of mixing two polyesters is directed to an improvement in pulverization property of a toner and self-crosslinkability of a toner adhered to a cleaning roller due to heat in addition to an improvement in low-temperature fixing property and anti-hot offset property. Therefore, nonlinear polyesters are selected for the first and second polyesters. Accordingly, the toner binders involve defects in transparency, and there has been room for improvement in the case of use for, in particular, color toner. Also, according to the disclosure of Japanese Patent Laid-Open No. 313760/1992, a toner binder is a mixture of polyesters and 20 parts of styrene-acrylic resin are added to 80 parts of toner binder at the time of manufacture of a toner. In some cases, toner with the styrene-acrylic resin added is inadequately decreased in lowest fixing temperature and a printed surface is poor in gloss.

Further, precise investigation has not been made in the prior art on the mixing condition of two polyesters. A toner binder formed by powder mixing polyesters, which are much different in softening point, together involves a problem that adequate dispersion of pigment cannot be made at the time of kneading of a toner. The pigment dispersibility is improved when a difference in softening point between two polyesters being subject to powder mixing is made small, but there is not attained the essential object of mixing two polyesters, directed to improvement in low-temperature fixing property and anti-hot offset property.

Hereupon, the first object of the invention is to provide a polyester toner binder, which is better in low-temperature fixing property and anti-hot offset property than that of the prior art.

The second object of the invention is to provide a toner binder having an excellent pigment dispersibility.

The third object of the invention is to provide a toner binder having other excellent qualities, which are generally required of a toner binder, such as stability of a toner, which is formed from the toner binder, in hot humid environment and cold, low and humid environment, heat storage stability, good charging property, and excellent glossiness of a printed surface if required.

Another object of the invention is to provide a method of manufacturing a polyester toner binder having excellent low-temperature fixing property, anti-hot offset property and pigment dispersibility.

DISCLOSURE OF THE INVENTION

The invention provides a toner binder which comprises an aggregate of binder resin particles composed of two polyesters (A) and (B), wherein the polyesters (A) and (B) are uniformly mixed in the particles.

The invention will be described in detail.

A toner binder according to the invention comprises an aggregate of particles of a binder resin composed of two polyesters (A) and (B), in which aggregate (A) is higher in softening point than (B), and (A) and (B) are substantially uniformly mixed in the particles. That is, particles, in which (A) and (B) are substantially uniformly mixed, are contained as an essential component.

The inventors of the present application have found that even in the case of mixing (A) and (B), which are much different in softening point, together, features of the both exhibit themselves when (A) and (B) are substantially uniformly mixed in the toner binder manufacturing process prior to the toner kneading process, and thus a toner binder and toner formed therefrom are improved in low-temperature fixing property and anti-hot offset property. Further, the inventors of the present application have found that when (A) and (B) are substantially uniformly mixed in the toner binder manufacturing process prior to the toner kneading process, pigment dispersibility is improved at the time of kneading of a toner binder, pigment and other additives in the dry toner manufacturing process.

In the invention, two polyesters (A), (B) are different in molecular weight or softening point, (A) being high in molecular weight or softening point, as compared with (B).

By making (A) high in molecular weight or softening point, a toner binder being a mixture and a toner formed therefrom are improved in anti-hot offset property, and by making (B) low in molecular weight or softening point, a toner binder and a toner formed therefrom are improved in low-temperature fixing property.

As a specific combination of (A) and (B), there are listed a combination (I): both (A) and (B) are polyesters containing no THF-insoluble component accompanying crosslinking, a combination (II): (A) is a polyester containing a THF-insoluble component and (B) is a polyester containing no THF-insoluble component, and a combination (III): both (A) and (B) are polyesters containing a THF-insoluble component.

While from the viewpoint of improving the anti-hot offset property of a toner binder and toner formed therefrom it is preferable to contain a THF-insoluble component accompanying crosslinking, from the viewpoint of imparting gloss to an image printed by the use of a toner it is preferable to contain no THF-insoluble component. Also, from the viewpoint of the low-temperature fixing property of a toner binder and a toner formed therefrom one of polyesters preferably contains no THF-insoluble component.

Accordingly, the above combination (I) is preferable for a color toner that requires gloss on images, and the combination (II) is preferable in the case of no need for gloss (for, for example, monochrome toner).

In the case where polyesters (A) and (B) in the combination (I) contain no THF-insoluble component accompanying crosslinking, an example of (A) is a polycondensate of polyol components and a polycarboxylic acid components. As the polyol component, there are listed diols (1), trivalent or higher polyols (2), short chain alkanoic acid esters (e.g., acetic acid ester) and so on. As the polycarboxylic acid component, there are listed dicarboxylic acids (3), trivalent or higher polycarboxylic acids (4), and acid anhydrides thereof or short chain alcohol-esters (methyl ester, ethyl ester, isopropylester, ethylene glycol ester and so on).

As diols (1), there are listed alkylene glycols (ethylene glycol, 1,2-propylene glycol, 1,3-propylene glycol, 1,4-butanediol, 1,6-hexanediol, dodecanediol and soon); alkylene ether glycols (diethylene glycol, triethylene glycol, dipropylene glycol, polyethylene glycol, polypropylene glycol, polytetramethylene ether glycol and so on); alicyclic diols (1,4-cyclohexane dimethanol, hydrogenated bisphenol A, hydrogenated bisphenol F and so on); bisphenols (bisphenol A, bisphenol F, bisphenol S and so on); alkylene oxide (ethylene oxide, propyleneoxide, butyleneoxide, styreneoxide, α-olefin oxide and so on) adducts of the above alicyclic diol; and alkylene oxide (ethylene oxide, propylene oxide, butylene oxide, styrene oxide, α-olefin oxide and so on) adducts of the above bisphenols, and so on. Among the above ones listed, alkylene glycols having the carbon atoms of 2 to 18, alkylene oxide addition products of bisphenols and alicyclic diols are preferable, and ethylene oxide, propylene oxide, butylene oxide, styrene oxide, α-olefin oxide addition products of bisphenols, alkylene glycols having the carbon atoms of 2 to 8, hydrogenated bisphenol A, hydrogenated bisphenol F and a combined use thereof are particularly preferable.

As trivalent or higher polyols (2), there are listed trivalent to octad or higher multivalent aliphatic alcohols (glycerin, trimethylolethane, trimethylolpropane, pentaerythritol, sorbitol and so on); trisphenols (trisphenol PA and so on); novolac resins (phenol novolac, cresol novolac and so on); alkylene oxide adducts of the above trisphenols; alkylene oxide adducts of the above novolac resins and so on. Among the above ones listed, trivalent to octad or higher multivalent aliphatic alcohols and alkylene oxide adducts of novolac resins are preferable, and alkylene oxide adducts of novolac resins are particularly preferable.

As dicarboxylic acids (3), there are listed alkylene dicarboxylic acids (succinic acid, adipic acid, azelaic acid, sebacic acid, dodecane dicarboxylic acid, octadecane dicarboxylic acid, dodecenyl succinic acid, pentadecenyl succinic acid, octadecenyl succinic acid, dimer acid and so on); alkenylene dicarboxylic acids (maleic acid, fumaric acid and so on); aromatic dicarboxylic acids (phthalic acid, isophthalic acid, terephthalic acid, naphthalene dicarboxylic acid and so on); and soon. Among the above ones listed, alkylene dicarboxylic acids having the carbon atoms of 4 to 50, alkenynylene dicarboxylic acids having the carbon atoms of 4 to 50, aromatic dicarboxylic acid having the carbon atoms of 8 to 20, and a combined use thereof are preferable, alkylene dicarboxylic acids having the carbon atoms of 4 to 50, aromatic dicarboxylic acids having the carbon atoms of 8 to 20, and a combined use thereof with alkylene dicarboxylic acids having the carbon atoms of 4 to 50 are further preferable, alkenynylene succinic acids having the carbon atoms of 16 to 50, terephthaiic acid, isophthalic acid, maleic acid, fumaric acid and a combined use thereof are more preferable, and terephthalic acid is particularly preferable.

As trivalent or higher polycarboxylic acids (4), there are listed aromatic polycarboxylic acids having the carbon atoms of 9 to 20 (trimellitic acid, pyromellitic acid and so on); vinyl polymers of unsaturated carboxylic acid (styrene/maleic acid copolymer, styrene/acrylic acid copolymer, α-olefin/maleic acid copolymer, styrene/fumaric acid copolymer and so on), and so on. Among the above ones listed, aromatic polycarboxylic acids having the carbon atoms of 9 to 20 is preferable, and trimellitic acid is particularly preferable.

Also, the compounds (1), (2), (3) and (4) can be copolymerized with hydroxy carboxylic acids (5).

As hydroxy carboxylic acids (5), there are listed hydroxy stearic acid, cured castor oil fatty acid and so on.

Also, as for (A), polyisocyanate, polyepoxide and so on can be used to extned and/or crosslink the polycondensate of a polyol component and a polycarboxylic acid component in order to provide for high molecular weight. The use of polyisocyanate and polyepoxide makes it easy for (A) to become high in molecular weight, and is advantageous in terms of the anti-hot offset property of a tonerbinder and a toner formed therefrom. However, polyester free from the use of these compounds is more preferable from the viewpoint of quickly charging of a toner and retention of charge on a toner.

As polyisocyanates, there are listed aliphatic polyisocyanate (tetramethylene diisocyanate, hexamethylene diisocyanate, 2,6-diisocyanato methyl caproate and so on); alicyclic polyisocyanates (isophorone diisocyanate, cyclohexyl methane diisocyanate and so on); aromatic diisocyanates (tolylene diisocyanate, diphenyl methane diisocyanate and so on); aromatic aliphatic diisocyanates (α, α, α', α'-tetramethyl xylylene diisocyanate and so on); isocyanurates; the polyisocyanates blocked by phenol derivatives, oxime, caprolactam and so on; and a combined use thereof.

As polyepoxides, there are listed polyglycidyl ethers (ethylene glycol diglycidyl ether, tetramethylene glycol diglycidyl ether, bisphenol A diglycidyl ether, bisphenol F diglycidyl ether, glycerin triglycidyl ether, pentaerythritol tetraglycidyl ether, phenol novolac glycidyl ether compounds and so on); diene oxides (pentadiene dioxide, hexadiene dioxide and so on), and so on.

A ratio of polyol to polycarboxylic acid is normally 2/1 to 1/2, preferably 1.3/1 to 1/1.3, and more preferably 1.2/1 to 1/1.1 in terms of an equivalent ratio [OH]/[COOH] of hydroxyl group [OH] and carboxyl group [COOH].

A ratio of trivalent or higher polyol (2) and trivalent or higher polycarboxylic acid (4) is such that the sum of molar numbers of (2) and (4) to the sum of molar numbers of (1) to (5) is normally less than 40 molar %, preferably less than 10 molar %, more preferably less than 8 molar %, and particularly preferably less than 5 molar %. Most preferably, (2) and (4) are not contained or even when (2) and (4) are contained, reaction is made as substantially one or two functions, the remaining functional groups being remained unreacted.

MwA which indicates a weight-average molecular weight of (A) is normally at least 20,000, preferably 20,000 to 2,000,000, more preferably 22,000 to 120,000, and particularly preferably 25,000 to 60,000. At least 20,000 is preferable from the viewpoint of the anti-hot offset property of a toner binder and a toner formed there from, and at most 2,000,000 is preferable from the viewpoint of imparting gloss to a printed surface.

Also, MwA is normally at least 1.5 times MwB which indicates a weight-average molecular weight of (B) described later, preferably 1.5 to 200 times, more preferably 1.8 to 50 times, and particularly preferably 2 to 20 times. By making a value of MwA/MwB within the above range, is attained the object of mixing (A) and (B), which is directed to an improvement in the low-temperature fixing property and the anti-hot offset property of a toner binder and a toner formed therefrom.

MnA which indicates a number-average molecular weight of (A) is normally at least 2,000, preferably 2,000 to 100,000, more preferably 3,000 to 50,000, and particularly preferably 5,000 to 30,000. At least 2,000 is preferable from the viewpoint of the heat storage stability of a toner.

Also, MnA is preferably at least 1.5 times MnB which indicates a number-average molecular weight of (B) described later, more preferably 1.5 to 20 times, further preferably 1.8 to 15 times, and particularly preferably 2 to 10 times. By making a value of MnA/MnB within the above value, is attained the object of mixing (A) and (B), which is directed to an improvement in the low-temperature fixing property and the anti-hot offset property of a toner binder and a toner formed therefrom.

A glass transition point (Tg) of (A) is normally 30 to 80° C., preferably 45 to 75° C., and more preferably 50 to 70° C. Tg of at least 30° C. is preferable from the viewpoint of the heat storage stability of a toner, and Tg of at least 80° C. is preferable from the viewpoint of the low-temperature fixing property of a toner binder and a toner formed therefrom.

A softening point of (A) is normally 90 to 180° C., preferably 110 to 160° C., and more preferably 120 to 140° C. At least 90° C. is preferable from the viewpoint of the anti-hot offset property of a toner binder and a toner formed therefrom, and at most 180° C. is preferable from the viewpoint of imparting gloss to a printed surface.

A hydroxyl value of (A) is normally at most 70 mgKOH/g, preferably 5 to 40 mgKOH/g, and more preferably 10 to 30 mgKOH/g. A small hydroxyl value is preferable in terms of stability of toner in cold, low and humid environment, stability of toner in hot humid environment, and small change in charging in hot humid environment.

An acid value of (A) is normally 0 to 40 mgKOH/g, preferably 1 to 30 mgKOH/g, more preferably 2 to 25 mgKOH/g, and particularly preferably 5 to 20 mgKOH/g. A small acid value improves stability of a toner in hot humid environment, and stability of a toner in cold, low and humid environment, but a proper acid value is preferable in enhancing quickly charging of toner.

As the polyester (B) in the combination (I), which contains no THF-insoluble component and is used together with the polyester (A) containing no THF-insoluble component, an example of the polyester (B) is a polycondensate of polyol components and polycarboxylic acid components. As the polyol component and polycarboxylic acid component, there are listed diol (1), trivalent or higher polyols (2), dicarboxylic acids (3), and trivalent or higher polycarboxylic acids (4) like in (A), and preferable examples are also the same as given there. Also, (A) and (B) may be the same as or different in composition from each other.

A ratio of polyol to polycarboxylic acid is normally 2/1 to 1/2, preferably 1.5/1 to 1/1.5, and more preferably 1.4/1 to 1/1.4 in terms of an equivalent ratio [OH]/[COOH] of hydroxyl group [OH] and carboxyl group [COOH].

A ratio of trivalent or higher polyol (2) to the sum of all polyol components is normally at most 10 molar %, preferably at most 5 molar %, and more preferably at most 3 molar %.

A ratio of trivalent or higher polycarboxylic acid (4) to the sum of all polycarboxylic acids is normally 0 to 30 molar % and more preferably 3 to 30 molar %, and trivalent or higher polycarboxylic acid of 5 to 15 molar % is particularly preferably contained to react as substantially one or two functions, the remaining functional groups being remained unreacted.

Containing trivalent or higher polycarboxylic acid, in particular, aromatic polycarboxylic acid is preferable in that a glass transition point becomes higher and the heat storage stability of toner is improved, but disadvantageous from the viewpoint of the low-temperature fixing property when a molecular weight distribution described later increases, so that in the case of containing trivalent or higher polycarboxylic acid, it is preferable that carboxyl group in excess of trivalent is not reacted.

MwB which indicates a weight-average molecular weight of (B) is normally at most 20,000, preferably 3,000 to 18,000, more preferably 4,000 to 15,000, and particularly preferably 5,000 to 13,000. At most 20,000 is preferable from the viewpoint of the low-temperature fixing property of a toner binder and a toner formed therefrom.

MnB which indicates a number-average molecular weight of (B) is normally at least 1,000, preferably 1,500 to 10,000, more preferably 1,600 to 6,000, and particularly preferably 2,000 to 5,000. At least 1,000 is preferable from the viewpoint of the heat storage stability of a toner binder and a toner formed therefrom.

MwB/MnB which indicates a molecular weight distribution of (B) is normally 1.5 to 10, preferably 1.8 to 4, more preferably 1.9 to 3.5, and particularly preferably 2 to 3.

A glass transition point of (B) is normally 30 to 80° C., preferably 45 to 75° C., and more preferably 50 to 70° C. Tg of at least 30° C. is preferable from the viewpoint of the heat storage stability of a toner, and Tg of at most 80° C. is preferable from the viewpoint of the low-temperature fixing property of a toner binder and a toner formed therefrom.

A softening point of (B) is normally 80 to 130° C., preferably 80 to 120° C., and more preferably 90 to 110° C. At least 80° C. is preferable from the viewpoint of the heat storage stability of a toner binder and a toner formed therefrom, and at most 130° C. is preferable from the viewpoint of the low-temperature fixing property of a toner binder and a toner formed therefrom. The relationship in softening point between (A) and (B) is such that the softening point of (A) is normally higher than that of (B), preferably higher at least 10° C., more preferably higher at least 15° C., particularly preferably higher at least 30° C. and most preferably higher at least 50° C.

A hydroxyl value of (B) is normally at most 70 mgKOH/g, preferably 5 to 50 mgKOH/g, and more preferably 10 to 45 mgKOH/g. A small hydroxyl value is preferable in terms of stability of a toner in cold, low and humid environment, stability of toner in hot humid environment, and small change in charging in hot humid environment.

An acid value of (B) is normally 0 to 40 mgKOH/g, preferably 1 to 30 mgKOH/g, more preferably 10 to 30 mgKOH/g, and particularly preferably 15 to 25 mgKOH/g. A small acid value improves stability of a toner in hot humid environment, and stability of a toner in cold, low and humid environment, but a proper acid value is preferable in enhancing quickly charging of toner.

Also, AVB which indicates an acid value of (B) is such that a function $\{AVB-[WPB\times(XPB-1)\times561/MPB]\}$, wherein WPB indicates content (weight %) of trivalent or higher aromatic polycarboxylic acid or anhydride thereof in (B), MPB average molecular weight of trivalent or higher aromatic polycarboxylic acid or anhydride thereof, and XPB average valence of trivalent or higher aromatic polycarboxylic acid or anhydride thereof in (B), is preferably −10 to 15, more preferably −6 to 12, and particularly preferably −3 to 10. The above range is appropriate in terms of the low-temperature fixing property of a toner binder and a toner formed therefrom and durability of a toner.

In the case where both (A) and (B) are polyesters containing no THF-insoluble component, that is, the combination (I), a ratio of WA to WB, wherein WA indicates weight % of (A), WB weight % of (B), is normally 50:50 to 10:90, preferably 45:55 to 15:85, more preferably 40:60 to 20:80, and particularly preferably 40:60 to 25:75.

Also, in the case where both (A) and (B) are polyesters containing no THF-insoluble component, that is, the combination (I), MwT which indicates a weight-average molecular weight of toner binder particles is preferably close to an average of weight-average molecular weights of (A) and (B), and a value of $[MwT\times(WA+WB)/(MwA\times WA+MwB\times WB)]$ is normally at least 0.8, preferably at least 0.85, and more preferably at least 0.9.

In the invention, in the case where (A) is a polyester containing a THF-insoluble component and (B) is a polyester containing no THF-insoluble component, that is, in the combination (II), an example of (A) is a polycondensate of polyol components and polycarboxylic acid components. As the polyol component and the polycarboxylic acid component, there are listed diols (1), trivalent or higher polyols (2), dicarboxylic acids (3), and trivalent or higher polycarboxylic acids (4) like in (A) in the case of the combination (I), and preferable examples are also the same as given there.

A ratio of polyol to polycarboxylic acid is normally 2/1 to 1/2, preferably 1.5/1 to 1/1.3, and more preferably 1.3/1 to 1/1.2 in terms of an equivalent ratio [OH]/[COOH] of hydroxyl group [OH] and carboxyl group [COOH].

A ratio of trivalent or higher polyol (2) and trivalent or higher polycarboxylic acid (4) is such that the sum of molar numbers of (2) and (4) to the sum of molar numbers of (1) to (5) is normally 0.1 to 40 molar %, preferably 1 to 25 molar %, more preferably 3 to 20 molar %, and particularly preferably 5 to 15 molar %.

Also, it is preferable to contain (4) as a trivalent or higher component, and a combined use of (2) and (4) is particularly preferable, especially, it being preferable to contain trivalent or higher aromatic polycarboxylic acid. A ratio of (4) to the sum of all polycarboxylic acids is normally 0 to 50 molar %, preferably 10 to 40 molar %, more preferably 15 to 40 molar %, and particularly preferably 15 to 30 molar %.

Containing (4), especially, trivalent or higher aromatic polycarboxylic acid is preferable in improving the anti-hot offset property of a toner binder and a toner formed therefrom.

TA which indicates a THF-insoluble component in (A) is normally at least 5 weight %, preferably at least 15 weight %, more preferably 20 to 70 weight %, further preferably 25 to 60 weight %, and particularly preferably 40 to 55 weight %.

Containing a THF-insoluble component is preferable in improving the anti-hot offset property of a toner binder and a toner formed therefrom.

A softening point of (A) is normally at least 120° C., preferably at least 131° C., more preferably 131 to 200° C., further preferably 135 to 190° C., and particularly preferably 160 to 180° C. By making the softening point at least 120° C., the anti-hot offset property of a toner binder and a toner formed therefrom is improved.

MwA which indicates a weight-average molecular weight of a THF-soluble component of (A) is normally at least 10,000, preferably at least 15,000, more preferably at least 20,000, and particularly preferably 25,000 to 2,000,000. At least 10,000 is preferable from the viewpoint of the anti-hot offset property of a toner binder and a toner formed therefrom.

Also, MwA is preferably larger than MwB which indicates a weight-average molecular weight of (B) described later.

A glass transition point of (A) is normally 30 to 80° C., preferably 45 to 75° C., and more preferably 50 to 70° C. Tg of at least 30° C. is preferable from the viewpoint of the heat storage stability of a toner, and Tg of at most 80° C. is preferable from the viewpoint of the low-temperature fixing property of a toner binder and a toner formed therefrom.

A hydroxyl value of (A) is normally at most 70 mgKOH/g, preferably 5 to 50 mgKOH/g, and more preferably 8 to 45 mgKOH/g. A small hydroxyl value is preferable in terms of stability of a toner in cold, low and humid environment, stability of a toner in hot humid environment, and small change in charging in hot humid environment.

An acid value of (A) is normally 0 to 40 mgKOH/g, preferably 8 to 30 mgKOH/g, more preferably 13 to 30 mgKOH/g, and particularly preferably 15 to 27 mgKOH/g. A small acid value improves stability of a toner in hot humid environment, and stability of a toner in cold, low and humid environment, but a proper acid value is preferable in enhancing quickly charging of toner and the anti-hot offset property of a toner binder and a toner formed therefrom.

Also, AVA which indicates an acid value of (A) is such that a function $\{AVA-[WPA\times(XPA-2)\times561/MPA]\}$, wherein WPA indicates content (weight %) of trivalent or higher aromatic polycarboxylic acid or anhydride thereof in (A), MPA average molecular weight of trivalent or higher aromatic polycarboxylic acid or anhydride thereof, and XPA average valence of trivalent or higher aromatic polycarboxylic acid or anhydride thereof in (A), is preferably −10 to 10, more preferably −5 to 10, and particularly preferably −5 to 5. The above range is appropriate in terms of being hard to generate irregularity of a fixed image of a toner and from the viewpoint of the anti-hot offset property of a toner binder and a toner formed therefrom.

In the combination (II), which contains no THF-insoluble component and is used together with the polyester (A)

containing a THF-insoluble component, an example of the polyester (B) is a similar one to the polyester (B) in the combination (I). Also, the components of the (B) are the same ones. Namely, there are listed the same components consisting of diols (1), trivalent or higher polyols (2), dicarboxylic acids (3), and trivalent or higher polycarboxylic acids (4), and preferable examples are also the same as given there.

A ratio of polyol to polycarboxylic acid is normally 2/1 to 1/2, preferably 1.5/1 to 1/1.5, and more preferably 1.4/1 to 1/1.4 in terms of an equivalent ratio [OH]/[COOH] of hydroxyl group [OH] and carboxyl group [COOH].

A ratio of trivalent or higher polyol (2) to the sum of all polyol components is normally at most 10 molar %, preferably at most 5 molar %, and more preferably at most 3 molar %.

A ratio of trivalent or higher polycarboxylic acid (4) to the sum of all polycarboxylic acids is normally at most 0 to 30 molar % and more preferably 3 to 30 molar %, and trivalent or higher polycarboxylic acid of 7 to 24 molar % is particularly preferably contained to react as substantially one or two functions, the remaining functional groups being remained unreacted.

Containing a trivalent or higher polycarboxylic acid, in particular, aromatic polycarboxylic acid is preferable in making higher in glass transition point and improving in the heat storage stability of toner, but becomes disadvantageous from the viewpoint of the low-temperature fixing property of toner binder and toner formed therefrom when a molecular weight distribution described later increases, so that in the case of containing trivalent or higher polycarboxylic acid, it is preferable that carboxyl group in excess of trivalent is not reacted.

MwB which indicates a weight-average molecular weight of (B) in the combination (II) is normally at most 20,000, preferably 2,000 to 15,000, more preferably 2,500 to 8,000, and particularly preferably 3,000 to 6,500. At most 20,000 is preferable from the viewpoint of the low-temperature fixing property of a toner binder and a toner formed therefrom.

Also, from the viewpoint of the low-temperature fixing property of a toner binder and a toner formed therefrom, (B) is more preferable in the case of being substantially linear than in the case of branching involved in crosslinking.

MnB which indicates a number-average molecular weight of (B) is normally at least 1,000, preferably 1,500 to 10,000, more preferably 1,600 to 5,000, and particularly preferably 1,800 to 4,000. At least 1,000 is preferable from the viewpoint of the heat storage stability of toner.

A glass transition point of (B) is normally 30 to 80° C., preferably 45 to 75° C., and more preferably 50 to 70° C. Tg of at least 30° C. is preferable from the viewpoint of the heat storage stability of toner, and Tg of at most 80° C. is preferable from the viewpoint of the low-temperature fixing property of a toner binder and a toner formed therefrom.

A softening point of (B) is normally 80 to 120° C., and preferably 85 to 115° C. At least 80° C. is preferable from the viewpoint of the heat storage stability of a toner, and at most 120° C. is preferable from the viewpoint of the low-temperature fixing property of a toner binder and toner formed therefrom. The relationship in softening point between (A) and (B) is such that the softening point of (A) is normally higher than that of (B), preferably higher at least 10° C., more preferably higher at least 15° C., particularly preferably higher at least 30° C., and most preferably higher at least 50° C. It is preferable from the viewpoint of compatibility of the low-temperature fixing property and the anti-hot offset property of a toner binder and a toner formed therefrom that the softening point of (A) normally higher than that of (B).

A hydroxyl value of (B) is normally at most 70 mgKOH/g, preferably 5 to 50 mgKOH/g, and more preferably 10 to 45 mgKOH/g. A small hydroxyl value is preferable in terms of stability of a toner in cold, low and humid environment, stability of a toner in hot humid environment, and small change in charging in hot humid environment.

An acid value of (B) is normally 0 to 50 mgKOH/g, preferably 1 to 45 mgKOH/g, more preferably 10 to 40 mgKOH/g, and particularly preferably 15 to 35 mgKOH/g. A small acid value improves stability of a toner in hot humid environment, and stability of a toner in cold, low and humid environment, but a proper acid value is preferable in enhancing quickly charging of toner.

Also, AVB which indicates an acid value of (B) is such that a function $\{AVB-[WPB\times(XPB-1)\times561/MPB]\}$, wherein WPB indicates content (weight %) of trivalent or higher aromatic polycarboxylic acid or anhydride thereof in (B), MPB average molecular weight of trivalent or higher aromatic polycarboxylic acid or anhydride thereof, and XPB average valence of trivalent or higher aromatic polycarboxylic acid or anhydride thereof in (B), is preferably −10 to 15, more preferably −6 to 12, and particularly preferably −3 to 10. The above range is appropriate in terms of the low-temperature fixing property of a toner binder and a toner formed therefrom and durability of a toner.

In the case of the combination (II), that is, the case where (A) is a polyester containing a THF-insoluble component and (B) is a polyester containing no THF-insoluble component, a ratio of WA to WB, wherein WA indicates weight % of (A), WB weight % of (B), is normally 80:20 to 20:80, preferably 60:40 to 25:75, more preferably 49:51 to 25:75, and particularly preferably 45:55 to 30:70.

Also, in the case where (A) contains a THF-insoluble component, TT which indicates a THF-insoluble component of toner binder particles, is preferably close to an average of THF-insoluble components of (A) and (B), and a value of $[TT/(TA\times WA/100)]$ is normally at least 0.8, preferably at least 0.85, and more preferably at least 0.9.

Specific examples of polyesters in (A) and (B) of the combination (I) containing no THF insoluble component among toner binders in the invention are listed as follows:

(1) (A): propylene oxide 2 mol. adduct of bisphenol A/terephthalic acid polycondensate (B): propylene oxide 2 mol. adduct of bisphenol A/terephthalic acid/maleic anhydride polycondensate (2) (A): ethylene oxide 2 mol. adduct of bisphenol A/terephthalic acid polycondensate (B): ethylene oxide 2 mol. adduct of bisphenol A/terephthalic acid/trimellitic anhydride polycondensate (3) (A): ethylene oxide 2 mol. adduct of bisphenol A/ethylene oxide 4 mol. adduct of bisphenol A/terephthalic acid polycondensate (B): ethylene oxide 2 mol. adduct of bisphenol A/terephthalic acid/trimellitic anhydride polycondensate (4) (A): propylene oxide 2 mol. adduct of bisphenol A/ethylene oxide 4 mol. adduct of bisphenol A/terephthalic acid polycondensate (B): ethylene oxide 2 mol. adduct of bisphenol A/terephthalic acid/trimellitic anhydride polycondensate (5) (A): propylene oxide 2 mol. adduct of bisphenol A/terephthalic acid/adipic acid polycondensate (B): propylene oxide 2 mol. adduct of bisphenol A/ethylene oxide 2 mol. adduct of bisphenol A/terephthalic acid/fumaric acid/trimellitic anhydride polycondensate Specific examples of polyesters in the combination (II), in which (A) contains a THF-insoluble component and (B) contains no THF-insoluble component, among toner binders in the invention are listed as follows:

(6) (A): propylene oxide 2 mol. adduct of bisphenol A/ethylene oxide 2 mol. adduct of bisphenol A/ethylene oxide adduct of phenol novolac/terephthalic acid/trimellitic anhydride polycondensate (B): propylene oxide 2 mol. adduct of bisphenol A/ethylene oxide 2 mol. adduct of bisphenol A/terephthalic acid/trimellitic anhydride polycondensate (7) (A): propylene oxide 2 mol. adduct of bisphenol A/propylene oxide adduct of phenol novolac/terephthalic acid/dodecenyl succinic anhydride/trimellitic anhydride polycondensate (B): propylene oxide 2 mol. adduct of bisphenol A/dodecenyl succinic anhydride/terephthalic acid/trimellitic anhydride polycondensate (8) (A): propylene oxide 2 mol. adduct of bisphenol A/propylene oxide 3 mol. adduct of bisphenol A/propylene oxide adduct of phenol novolac/terephthalic acid/trimellitic anhydride polycondensate (B): propylene oxide 2 mol. adduct of bisphenol A/propylene oxide 3 mol. adduct of bisphenol A/terephthalic acid/trimellitic anhydride polycondensate (9) (A): propylene oxide 2 mol. adduct of bisphenol A/ethylene oxide 2 mol. adduct of bisphenol A/terephthalic acid/trimellitic anhydride polycondensate (B): propylene oxide 2 mol. adduct of bisphenol A/ethylene oxide 2 mol. adduct of bisphenol A/terephthalic acid/trimellitic anhydride polycondensate

(10) (A): propylene oxide 2 mol. adduct of bisphenol A/propylene oxide 3 mol. adduct of bisphenol A/propylene oxide adduct of phenol novolac/terephthalic acid/trimellitic anhydride polycondensate (B): propylene oxide 2 mol. adduct of bisphenol A/fumaric acid/trimellitic anhydride polycondensate As a method of manufacturing a toner binder according to the invention, the following methods are listed.

Polyesters (A), (B) are obtained by dehydration polymerization in accordance with the usual method such as by heating polycarboxylic acid and polyol at 150 to 280° C. in a flow of an inert gas, for example, nitrogen in the existence of a known esterification catalyst, for example, tetrabutoxititanate, dibutyltin oxide or the like. An operation under reduced pressure is also effective in order to increase the reaction rate at the last stage of reaction.

(A) is obtained by proceeding reaction while following viscosity or softening point when the last stage of reaction is just around the corner, and taking out a semi-product from a reactor to cool the same when a predetermined viscosity or softening point is reached.

In synthesis of (B), in the case where a trivalent or higher polycarboxylic acid is used to react substantially as one or two functions and the remaining functions are caused to remain unreacted, acid anhydride is used as trivalent or higher polycarboxylic acid. Namely, after an ordinary polyesterification is performed without the trivalent or higher polycarboxylic acid, the acid anhydride of trivalent or higher polycarboxylic acid is added at 150 to 200° C., and reaction is made at atmospheric pressure or under application of pressure for 30 minutes to two hours. Thus, half-esterification of acid anhydride performs preferentially.

Pulverization of (A), (B) may be performed by means of a known pulverizer. Known pulverizers include crushers (jaw crusher, gyratory crusher, hammer crusher, roll crusher, and so on), roller mills (ring roller mill, ball bearing mill, and so on), stamp mill, shear mills (cutter mill, feather mill, and so on), rod mill, impact pulverizers (hammer mill, cage mill, pin mill, disintegrator, atomizer, pulverizer, and so on), turbo type pulverizers (turbo mill, micro cyclomalto, hurricane mill, and so on), ball mills (tube mill, conical ball mill, radial mill, tower mill, disk mill, and soon), centrifugal classification-mill, jet mill, colloid mill, and so on. Crushers, shear mills, impact pulverizers, and turbo type pulverizers are preferable among the above pulverizers as listed. Crushers impact pulverizers are more preferable.

Particle size of (A) and (B) may be optional, but average particle size of 0.02 to 15 mm is preferable from the viewpoint of workability in handling, and 0.05 to 10 mm is particularly preferable. In some cases, average particle size below 0.02 mm causes poor workability due to reduction in fluidity of particles. With average particle size over 15 mm, it takes much time until melting, during which polyester may possibly be changed in quality due to reaction of ester interchange. Also, a small difference in particle size between (A) and (B) is preferable from the viewpoint of prevention of classification at the time of mixing, and it is particularly preferable that a ratio of average particle sizes to each other is 0.3 to 3.3.

A method of mixing (A) and (B) with each other comprises melting (A) and (B). An appropriate temperature for mixing can be determined from the viewpoint of efficient mixing, and it is advisable to select temperature in the range from a temperature lower 20° C. than the softening point of (B) to a temperature higher 40° C. than the softening point of (A). Setting a mixing temperature below a temperature lower 20° C. than the softening point of (B) is not preferable because (A) and (B) cannot be adequately mixed with each other. Also, when a mixing temperature is set above a temperature higher 40° C. than the softening point of (A), undesirable transesterification between (A) and (B) is generated to degrade the low-temperature fixing property and anti-hot offset property of a toner binder and a toner formed therefrom. A value of the mixing temperature is normally 80 to 180° C., preferably 100 to 170° C., and more preferably 120 to 160° C.

Mixing time is normally 10 seconds to 30 minutes, preferably 20 seconds to 10 minutes, and more preferably 30 seconds to 5 minutes. IF the mixing time is long, ester interchange of (A) and (B) is generated. Consequently, a toner binder and a toner formed therefrom degrades the low-temperature fixing property and anti-hot offset property.

As a mixing apparatus, there are listed batch mixing in a reaction vessel, and continuous mixing apparatuses. Continuous mixing apparatuses are preferable in order to effect uniform mixing at an appropriate temperature for a short time. As continuous mixing apparatuses, there are listed extruders, continuous kneaders, three-rolls and so on. Extruders and continuous kneaders among the above are preferable, and continuous kneaders are particularly preferable.

Also, other components such as wax and so on can be simultaneously mixed when (A) and (B) are mixed with each other.

No particular limitation is imposed on a period of time required for cooling to 60° C. from a molten state at the time of mixing. However, the period of time within 10 minutes is more preferable for improvement in durability of a toner. Known resin cooling machines can be used as a cooling apparatus. There are illustrated steel belt cooling machines, drum coolers, roll cooling machines, air-cooling belts, strand cooling machines, and so on. Steel belt cooling machines, drum coolers, and roll cooling machines are particularly preferable.

A toner binder is made particulate by pulverizing a cooled and solidified resin after mixing, with the use of a pin mill, roll mill, hammer mill, cutter mill or the like. A central value of particle diameter distribution is normally 0.02 to 20 mm, and preferably 0.1 to 10 mm.

While a toner binder according to the invention contains particles, in which (A) and (B) are uniformly mixed with each other, as an essential component, as described above, it may contain other particles. Other particles include particles of (A) itself, particles of (B) itself, and other particles.

A ratio of the number of particles, in which (A) and (B) are uniformly mixed with each other, in an aggregate of particles is normally at least 10%, preferably at least 50%, and more preferably at least 70%. Preferably, the more particles, in which (A) and (B) are uniformly mixed with each other, the more pigment dispersibility is improved at the time of manufacture of toner.

Whether toner binder particles are uniformly mixed is determined by comparing a measurement of weight-average molecular weight every one particle of the toner binder (MwT) with weight-average molecular weights (MwA) and (MwB) of (A) and (B). In toner binder particles, in which (A) and (B) are not uniformly mixed with each other, individual particles are (A) itself or (B) itself, and a weight-average molecular weight every toner binder particle (MwT) corresponds to MwA or MwB. On the other hand, toner binder particles uniformly mixed are particles, in which MwT assumes a value between MwA and MwB, that is, a value satisfying the following relationship (1-0).

$$MwA>MwT>MwB \quad (1\text{-}0)$$

However, since (A), (B) and toner binder particles have a molecular weight distribution, a relationship applicable to actual measurements is as follows (1—1) taking account of the molecular weight distribution:

$$MwA\times0.95\geqq MwT\geqq MwB\times1.05 \quad (1\text{—}1)$$

The number of particles, in which a value of MwT satisfies the relationship (1—1), among an aggregate of toner binder particles as observed is preferably at least 10 per 20 toner binder particles, more preferably at least 14, particularly preferably at least 16 and most preferably at least 18. Preferably, the more particles, which satisfy the relationship (1—1), the more pigment dispersibility is improved at the time of manufacture of a toner. Also, a value of MwT is preferably at most 0.9 times MwA and at least 1.1 times MwB, and particularly preferably at least 0.85 times MwA and at least 1.15 times MwB. That is, the following relationship (1-2) is preferably satisfied, and the following relationship (1-3) is particularly preferably satisfied.

$$MwA\times0.9\geqq MwT\geqq MwB\times1.1 \quad (1\text{-}2)$$

$$MwA\times0.85\geqq MwT\geqq MwB\times1.15 \quad (1\text{-}3)$$

The number of particles, in which MwT is between MwA and MwB, can be determined in the following manner. Any one particle of a toner binder is dissolved in a GPC solvent such as tetrahydrofuran (THF) or the like, GPC is measured in accordance with the usual method, and a weight-average molecular weight thereof is measured. In the case where a THF-insoluble component is present at that time, filtering is performed by means of a membrane filter. Such measurement is carried out for 20 particles.

Also, weight-average molecular weights of (A) and (B) are measured by GPC in the same manner, and these values are substituted into the respective relationships (1—1), (1-2), (1-3) for comparison.

In addition, toner binder particles being subjected to GPC measurement are optionally selected. Selection of particles being minute in particle size is not preferable because accuracy in GPC measurement is degraded due to a small weight of one particle and at the same time local deviation is overestimated, so that there is the possibility that correct typical values cannot be obtained. Accordingly, it is desired that particles having a particle size equal to or larger than an average value in the particle size distribution of toner binder particles be selected as a specimen of measurement.

A toner binder according to the invention is mixed with a coloring agent and various additive agents such as a releasing agent, a charge control agent or the like, at need to be used as a dry toner.

Known dyestuff, pigment and magnetic powder can be used for coloring agents. Specifically, there are listed carbon black, sudan black SM, fast yellow G, benzidine yellow, pigment yellow, indofast orange, Irgacin red, paranitroaniline red, toluidine red, carmine FB, pigment orange R, lake red 2 G, rhodamine FB, rhodamine B rake, methyl violet B rake, phthalocyanine blue, pigment blue, brilliant green, phthalocyanine green, oil yellow GG, Kayaset YG, olasol brown B, oil pink OP, magnetite, iron black, and so on. Content of a coloring agent in a toner is normally 2 to 15 weight % in the use of dyestuff or pigment, and normally 20 to 70 weight % in the use of magnetic powder.

As a releasing agent, it is possible to use known compounds, for example, polyolefin wax (polyethylene wax, polypropylene wax, and so on); long-chain hydrocarbon (paraffin wax, sasol wax, and so on); carbonyl group containing wax (carnauba wax, montan wax, distearyl ketone, and so on), and so on. Content of a releasing agent in a toner is normally 0 to 10 weight %, and preferably 1 to 7 weight %.

As a charging control agent, there are listed known compounds, that is, nigrosine dyestuff, 4-quaternary ammonium salt compound, 4-quaternary ammonium group containing polymer, metal-containing azo dyestuff, salicylic acid metal salt, sulfonic group containing polymer, fluorine-containing polymer, halogen-substituted aromatic ring containing polymer, and so on. Content of a charging control agent in toner is normally 0 to 5 weight %.

Further, it is possible to use a fluidizing agent. As a fluidizing agent, it is possible to use known compounds, such as colloidal silica, alumina powder, titanium oxide powder, calcium carbonate powder, and so on.

Methods of manufacturing a dry toner include a known kneading and a pulverizing method. Mixing in molten state is performed after the above toner components are subjected to dry blending. A kneading temperature is normally 90 to 240° C., preferably 95 to 170° C., and particularly preferably 105 to 150° C. As a result of kneading becoming inadequate below 90° C., durability of toner is in some cases inadequate. Resins cause degradation and deterioration above 240° C., and so in some cases, toner becomes inadequate in charging property. Time for kneading is normally 25 to 200 seconds, preferably 30 to 130 seconds, and particularly preferably 50 to 120 seconds. As a result of kneading becoming inadequate in less than 25 seconds, durability of toner is in some cases inadequate. Resins are liable to cause deterioration in beyond 200 seconds, and so in some cases, toner becomes inadequate in charging property. After mixing in molten state, the resin is subjected to minute pulverization by a jet mill or the like, and further to air separation, whereby particles having normally the particle size of 2 to 20 μm are obtained.

A dry toner making use of a toner binder according to the invention is mixed with carrier particles, such as iron powder, glass beads, nickel powder, ferrite, magnetite, ferrite, of which surfaces are coated with a resin (acrylic resin, silicone resin, and so on), as desired, to be used as developer for electric latent image. Also, instead of carrier particles, electric latent image can be formed by friction with a member such as charging blade.

Subsequently, the toner is fixed on a support body (paper, polyester film, and so on) by a known hot-roll fixing method to provide a recording material.

BEST MODE FOR CARRYING OUT THE INVENTION

While the invention will be further described by way of embodiments, it is not limited thereto. The word part(s) hereunder represents weight part(s).

A method of measuring properties of polyester (A), polyester (B), and a toner binder obtained in embodiments and comparative examples will be shown in the following.

1. Acid Value and Hydroxyl Value

Method prescribed in JIS K0070

In addition, in the case where a specimen contained a solvent insoluble component accompanying crosslinking, a specimen after mixing in molten state was used in the following method.

Kneading apparatus: Labo plastomill MODEL 30R150 manufactured by Toyo Seiki Seisaku-sho, Ltd.

Kneading condition: 130° C. for 30 minutes at 70 rpm

2. Glass Transition Point (Tg)

Method (DSC method) prescribed in ASTM D3418-82

Apparatus: DSC20, SSC/580 manufactured by Seiko Instruments Inc.

3. Molecular Weight

A THF-soluble component was measured by gel permeation chromatography (GPC).

Conditions of measurement of molecular weight by GPC were as follows:

Apparatus: HLC-8120 manufactured by Tosoh Corporation

Column: TSK GEL GMH6 (manufactured by Tosoh Corporation) connecting two columns in series Temperature in measurement: 25° C.

Specimen solution: 0.25 weight % of tetrahydrofuran (THF) solution

Injection amount of solution: 200 μl

Detection Apparatus: Refractive Index Detector

In addition, molecular weight correction curves were formed by means of a standard polystyrene.

Also, molecular weight of toner binder particles was measured by means of a specimen solution, which was formed by taking out any one particle in the toner binder and dissolving the same in THF, for 10 particles, and an average value of measurements was assumed to be a value of molecular weight.

4. Tetrahydrofuran (THF) Insoluble Component 50 ml of THF was added to 0.5 g of a specimen, and subjected to agitation under refluxing for three hours. After cooling, an insoluble component was filtered by a glass filter and subjected to drying under reduced pressure at 80° C. for three hours. An insoluble component was calculated from a ratio of weight of a resin component on the glass filter to weight of the specimen.

5. Measurement of Softening Point

A flow tester was used to raise temperature in uniform velocity, and a softening point was given by temperature when an amount of outflow reached ½.

Apparatus: Flow tester CFT-500 manufactured by SHIMAZU CORPORATION

Load: 20 kg

Die: 1 mmϕ–1 mm

Temperature rising velocity: 6° C./min.

Embodiment-1

[Synthesis of Polyester (A)]

719 parts of ethylene oxide 2 mol. adduct of bisphenol A, 352 parts of terephthalic acid and 3 parts of dibutyltin oxide as a condensation catalyst were put into a reaction vessel equipped with a cooling tube, an agitator and a nitrogen introduction tube, and were caused to react in a flow of nitrogen at 230° C. for ten hours with dehydration. Subsequently, the semi-product was caused to react under reduced pressure of 5 to 20 mmHg, taken out at the point of time when the softening point became 128° C., cooled to room temperature and pulverized to provide particles of polyester (A1).

Polyester (A1) contained no THF-insoluble component, and was substantially linear with acid value of 1, hydroxyl value of 6, Tg of 71° C., number-average molecular weight of 7800, and weight-average molecular weight of 30000.

[Synthesis of Polyester (B)]

725 parts of ethylene oxide 2 mol. adduct of bisphenol A, 284 parts of terephthalic acid and 3 parts of dibutyltin oxide as a condensation catalyst were put into a reaction vessel equipped with a cooling tube, an agitator and a nitrogen introduction tube, and were caused to react in a flow of nitrogen at 230° C. for ten hours with dehydration. Subsequently, the semi-product was caused to react under reduced pressure of 5 to 20 mmHg, and cooled to 180° C. at the point of time when the acid value became 2 or less, 48 parts of trimellitic anhydride were added, the semi-product was taken out after two-hour reaction under sealing at atomospheric pressure, cooled to room temperature and pulverized to provide particles of polyester (B1).

Polyester (B1) contained no THF-insoluble component, and was substantially linear with the softening point of 93° C., acid value of 26, hydroxyl value of 42, Tg of 60° C., number-average molecular weight of 2700 and weight-average molecular weight of 6400.

[Synthesis of Toner Binder]

300 parts of polyester (A1) and 700 parts of polyester (B1) were mixed in molten state in a continuous kneader at a jacket temperature of 150° C. for 3 minutes of retention time. The melted resin was cooled to 30° C. in four minutes by means of a steel belt cooler. And the resin was subjected to cooling until room temperature was reached, and pulverized by a pulverizer to provide particles of a toner binder (1) of the invention.

The toner binder (1) had the acid value of 19, hydroxyl value of 31, Tg of 63° C., number-average molecular weight of 3400, and weight-average molecular weight of 13500. Twenty measured values of weight-average molecular weight every one toner binder particle were distributed about 13500, and particles having measured values between 7360 and 25500, which satisfy the above-mentioned relationship (1-3), were 20 in number among 20 particles.

COMPARATIVE EXAMPLE-1

[Synthesis of Toner Binder]

300 parts of polyester (A1) and 700 parts of polyester (B1) were powder mixed in a Henschel mixer for five minutes to provide a comparative toner binder (C1).

The comparative toner binder (C1) had the acid value of 19, hydroxyl value of 31, Tg of 63° C., number-average molecular weight of 3400, and weight-average molecular weight of 13500. Twenty measured values of weight-average molecular weight every one toner binder particle were distributed about two peaks in the vicinity of 6400 and in the vicinity of 30000, and particles having measured values between 6400 and 30000 were 4 in number among 20 particles, and no particle having measured values between 7360 and 25500, satisfying the above-mentioned relationship (1-3), was present among 20 particles.

Embodiment-2

[Synthesis of Polyester (B)]

371 parts of ethylene oxide 2 mol. adduct of bisphenol A, 395 parts of propylene oxide 2 mol. adduct of bisphenol A, 175 parts of terephthalic acid, 87 parts of fumaric acid, 20 parts of hydroquinon, and 3 parts of dibutyltin oxide as a condensation catalyst were put into a reaction vessel equipped with a cooling tube, an agitator and a nitrogen introduction tube, and were caused to react in a flow of nitrogen at 200° C. for ten hours with dehydration. Subsequently, the semi-product was caused to react under reduced pressure of 100 mmHg at 180° C., at the point of time when the acid value became 8, 32 parts of trimellitic anhydride were added, the semi-product was taken out after one-hour reaction under sealing at atomospheric pressure, cooled to room temperature and pulverized to provide particles of polyester (B2).

Polyester (B2) contained no THF-insoluble component, and was substantially linear with the softening point of 85° C., acid value of 23, hydroxyl value of 50, Tg of 55° C., number-average molecular weight of 2000, and weight-average molecular weight of 5000.

[Synthesis of Toner Binder]

300 parts of polyester (A1) and 700 parts of polyester (B2) were mixed in molten state in a biaxial extruder at a jacket temperature of 150° C. for one minute of retention time, and the melted resin was subjected to cooling in a thin-film state. A period of time required until 30° C. was reached was 10 minutes. Further, the resin was subjected to cooling until room temperature was reached, and pulverized by a pulverizer to provide particles of a toner binder (2) of the invention.

The toner binder (2) had the acid value of 16, hydroxyl value of 37, Tg of 60° C., number-average molecular weight of 2600, and weight-average molecular weight of 12500. Twenty measured values of weight-average molecular weight every one toner binder particle were distributed about 12500, and particles having measured values between 5750 and 25500, which satisfy the above-mentioned relationship (1-3), were 20 in number among 20 particles.

Embodiment-3

[Synthesis of Polyester (A)]

130 parts of ethylene oxide 2 mol. adduct of bisphenol A, 553 parts of propylene oxide 2 mol. adduct of bisphenol A, 192 parts of terephthalic acid, 155 parts of dodecenyl succinic anhydride, 37 parts of trimellitic anhydride, and 3 parts of dibutyltin oxide as a condensation catalyst were put into a reaction vessel equipped with a cooling tube, an agitator and a nitrogen introduction tube, and were caused to react in a flow of nitrogen at 210° C. for ten hours with dehydration. Subsequently, the semi-product was caused to react under reduced pressure of 5 to 20 mmHg, taken out at the point of time when the softening point became 122° C., cooled to room temperature and pulverized to provide particles of polyester (A3).

The polyester (A3) contained no THF-insoluble component, and had the acid value of 10, hydroxyl value of 14, Tg of 65° C., number-average molecular weight of 6400, and weight-average molecular weight of 73000.

[Synthesis of Polyester (B)]

739 parts of propylene oxide 2 mol. adduct of bisphenol A, 176 parts of terephthalic acid, 104 parts of maleic anhydride, 20 parts of hydroquinon, and 3 parts of dibutyltin oxide as a condensation catalyst were put into a reaction vessel equipped with a cooling tube, an agitator and a nitrogen introduction tube, and were caused to react in a flow of nitrogen at 200° C. for ten hours with dehydration. Subsequently, the semi-product was caused to react under reduced pressure of 100 mmHg, taken out at the point of time when the softening point became 104° C., cooled to room temperature and pulverized to provide particles of polyester (B3).

Polyester (B3) contained no THF-insoluble component, and had the softening point of 104° C., acid value of 7, hydroxyl value of 31, Tg of 65° C., number-average molecular weight of 4500, and weight-average molecular weight of 13500.

[Synthesis of Toner Binder]

500 parts of polyester (A3) and 500 parts of polyester (B3) were mixed in molten state in a continuous kneader at a jacket temperature of 150° C. for 2 minutes of retention time, and cooled to 30° C. in four minutes by means of a steel belt cooler. And the resin was subjected to cooling until room temperature was reached, and pulverized by a pulverizer to provide particles of a toner binder (3) of the invention.

The toner binder (3) had the acid value of 9, hydroxyl value of 23, Tg of 65° C., number-average molecular weight of 5300, and weight-average molecular weight of 43000. Twenty measured values of weight-average molecular weight every one toner binder particle were distributed about 43000, and particles having measured values between 15600 and 62000, which satisfy the above-mentioned relationship (1-3), were 20 in number among 20 particles.

EVALUATION EXAMPLES-1–3 AND COMPARATIVE EVALUATION EXAMPLE-1

100 parts of the toner binders (1) to (3) of the invention or comparative toner binder (C1), 5 parts of carnauba wax and 4 parts of cyanin blue KRO (manufactured by Sanyo Pigment Co., Ltd.) were made into toner in the following way.

After premix was carried out with the use of a Henschel mixer (FM10B: manufactured by Mitsui Miike Chemical Eng. Machine Co., Ltd.), then kneading was carried out at 140° C. for 95 seconds of retention time with the use of a biaxial kneader (PCM-30: manufactured by Ikegai Corporation). Subsequently, pulverization was carried out with the use of a supersonic jet pulverizer labojet (manufactured by Nippon Pneumatic Industry Ltd.), and thereafter classification was carried out with an air classifier (MDS-I: manufactured by Nippon Pneumatic Industry Ltd.) to provide toner particles having a particle size d50 of 8 μm. Subsequently, a sample mill was used to mix 0.5 parts of colloidal silica (aerosil R972:manufactured by Nippon Aerosil Co., Ltd.) with 100 parts of toner particles to provide toners (1) to (3) and a comparative toner (C1).

TABLE 1 shows results of evaluation.

TABLE 1

| Toner No. | GLOSS | HOT | Pigment dispersibility |
|---|---|---|---|
| toner (1) | 140° C. | 190° C. | ○ |
| toner (2) | 130° C. | 180° C. | ○ |
| toner (3) | 150° C. | 200° C. | ○ |
| comparative toner (C1) | 145° C. | 180° C. | x |

[Method of Evaluation]

[1] Gloss Manifesting Temperature (GLOSS)

A fixing device of a commercially available color printer (LBP2160; manufactured by Canon Inc.) was used for evaluation of fixing. A fixing roll temperature, at which gloss (quantity of reflected light of incident light with incident angle of 60 degree) of a fixed image became at least 10%, was adopted as a gloss manifesting temperature.

[2] Hot Offset Generating Temperature (HOT)

Like the above GLOSS, evaluation of fixing was made, and the existence of hot offset on a fixed image was evaluated visually. A fixing roll temperature, at which hot offset was generated, was made an hot offset generating temperature.

[3] Pigment Dispersibility

Toner was melted and formed on a slide glass to be made filmy. The filmy toner was observed at a magnifying power of 400 with the use of an optical microscope, and the existence of aggregates of pigment was evaluated visually.

Criterion ○: no aggregate

Δ: slight aggregate x: many aggregates

The toner binders (1), (2), (3) forming the toners (1), (2), (3) were mixtures of two polyesters, differences in softening point between which were 35° C., 43° C. and 18° C., respectively, and provided toners having a low-temperature fixing property and anti-hot offset property. On the other hand, the comparative toner (C1) lacked the mixing process, in which (A) and (B) were melted, and was high in gloss manifesting temperature, low in hot offset generating temperature and poor in pigment dispersibility as compared with the toner (1).

Embodiment-4

[Synthesis of Polyester (A)]

309 parts of propylene oxide 2 mol. adduct of bisphenol A, 437 parts of propylene oxide 3 mol. adduct of bisphenol A, 21 parts of ethylene oxide 5 mol. adduct of phenol novolac (average polymerization degree of about 5), 121 parts of terephthalic acid, 74 parts of fumaric acid, and 3 parts of dibutyltin oxide as a condensation catalyst were put into a reaction vessel equipped with a cooling tube, an agitator and a nitrogen introduction tube, were caused to react in a flow of nitrogen at 210° C. for ten hours with dehydration, and thereafter were caused to react under reduced pressure of 5 to 20 mmHg until the acid value became 2 or less. Subsequently, after 87 parts of trimellitic anhydride were added and the semi-product was caused to react at atmospheric pressure for 1 hour, the semi-product was caused to react under reduced pressure of 20 to 40 mmHg, taken out at the point of time when the softening point became 160° C., cooled to room temperature and pulverized to provide particles of polyester (A4).

Polyester (A4) contained a THF-insoluble component of 45% and had the acid value of 20, hydroxyl value of 23, Tg of 63° C., and the THF-soluble component had the weight-average molecular weight of 21000.

[Synthesis of Polyester (B)]

465 parts of ethylene oxide 2 mol. adduct of bisphenol A, 330 parts of propylene oxide 2 mol. adduct of bisphenol A, 92 parts of terephthalic acid, and 3 parts of dibutyltin oxide as a condensation catalyst were put into a reaction vessel equipped with a cooling tube, an agitator and a nitrogen introduction tube, and were caused to react in a flow of nitrogen at 230° C. for 5 hours with dehydration. Subsequently, the semi-product was caused to react under reduced pressure of 5 to 20 mmHg, and cooled to 200° C. at the point of time when the acid value became 2 or less. 193 parts of fumaric acid was added to the semi-product, which was caused to react in a flow of nitrogen at 200° C. for 6 hours with dehydration. Subsequently, the semi-product was caused to react under reduced pressure of 100 mmHg at 180° C., and 27 parts of trimellitic anhydride were added at the point of time when the softening point became 105° C. The semi-product was taken out after one-hour reaction at 180° C. under sealing at nomal pressure, cooled to room temperature and pulverized to provide particles of polyester (B4).

Polyester (B4) contained no THF-insoluble component, and was substantially linear with the softening point of 97° C., acid value of 27, hydroxyl value of 21, Tg of 59° C., number-average molecular weight of 3500, and weight-average molecular weight of 11400.

[Synthesis of Toner Binder]

450 parts of polyester (A4) and 550 parts of polyester (B4) were mixed in molten state in a continuous kneader at a jacket temperature of 150° C. for 1 minute of retention time. The melted resin was cooled to room temperature and then pulverized by a pulverizer to provide particles of a toner binder (4) of the invention.

The toner binder (4) contained a THF-insoluble component of 20% and had the acid value of 24, hydroxyl value of 22, Tg of 61° C., and the THF-soluble component had the weight-average molecular weight of 16000. Twenty measured values of weight-average molecular weight every one toner binder particle were distributed about 16000, and particles having measured values between 13100 and 17800, which satisfy the above-mentioned relationship (1-3), were 20 in number among 20 particles.

COMPARATIVE EXAMPLE-2

[Synthesis of Toner Binder]

450 parts of polyester (A4) and 550 parts of polyester (B4) were powder mixed in a Henschel mixer for five minutes to provide a comparative toner binder (C2).

The comparative toner binder (C2) contained a THF-insoluble component of 20% and had the acid value of 24, hydroxyl value of 22, Tg of 61° C., and the THF-soluble component had the weight-average molecular weight of 15700. Twenty measured values of weight-average molecular weight every one toner binder particle were distributed about two peaks in the vicinity of 11400 and in the vicinity of 21000, and particles having measured values between 11400 and 21000 were 2 in number among 20 particles, and no particle having measured values between 13100 and 17800, satisfying the above-mentioned relationship (1-3), was present among 20 particles.

Embodiment-5

[Synthesis of Toner Binder]

700 parts of polyester (A4) and 300 parts of polyester (B4) were mixed in molten state in a continuous kneader at a jacket temperature of 150° C. for 1 minute of retention time. The melted resin was cooled to room temperature and then pulverized by a pulverizer to provide particles of a toner binder (5) of the invention.

The toner binder (5) contained a THF-insoluble component of 31% and had the acid value of 24, hydroxyl value of 23, Tg of 62° C., and the THF-soluble component had the weight-average molecular weight of 18000. Twenty measured values of weight-average molecular weight every one toner binder particle were distributed about 18000, and particles having measured values between 11400 and 21000 were 20 in number among 20 particles, particles having measured values between 12500 and 18900, which satisfy the above-mentioned relationship (1-2), being 18 in number among 20 particles, and particles having measured values between 13100 and 17800, which satisfy the above-mentioned relationship (1-3), being 8 in number among 20 particles.

COMPARATIVE EXAMPLE-3

[Synthesis of Toner Binder]

700 parts of polyester (A4) and 300 parts of polyester (B4) were put into a reaction vessel of stainless steel and mixed in a flow of nitrogen at 190° C. for 1 hour. The melted resin was cooled to room temperature and then pulverized by a pulverizer to provide particles of a comparative toner binder (C3) of the invention.

The comparative toner binder (C3) contained a THF-insoluble component of 17% and had the acid value of 22, hydroxyl value of 23, and Tg of 60° C., and the THF-soluble component had 1 peak of GPC chromatogram and had the weight-average molecular weight of 43000. It had been found that reaction of ester interchange was generated, the resin was changed into a uniform polyester, and two polyesters were not present.

Embodiment-6

[Synthesis of Polyester (A)]

779 parts of propylene oxide 3 mol. adduct of bisphenol A, 153 parts of terephthalic acid, 54 parts of fumaric acid, and 3 parts of dibutyltin oxide as a condensation catalyst were put into a reaction vessel equipped with a cooling tube, an agitator and a nitrogen introduction tube, were caused to react in a flow of nitrogen at 210° C. for ten hours with dehydration, and thereafter were caused to react under reduced pressure of 5 to 20 mmHg until the acid value became 2 or less. Subsequently, after 71 parts of trimellitic anhydride were added and the semi-product was caused to react at atmospheric pressure for 1 hour, the semi-product was caused to react under reduced pressure of 20 to 40 mmHg, taken out at the point of time when the softening point became 171° C., cooled to room temperature and pulverized to provide particles of polyester (A6).

Polyester (A6) contained a THF-insoluble component of 51% and had the acid value of 14, hydroxyl value of 19, Tg of 59° C., and the THF-soluble component had the weight-average molecular weight of 33000.

[Synthesis of Polyester (B)]

173 parts of ethylene oxide 2 mol. adduct of bisphenol A, 553 parts of propylene oxide 2 mol. adduct of bisphenol A, 251 parts of terephthalic acid, and 3 parts of dibutyltin oxide as a condensation catalyst were put into a reaction vessel equipped with a cooling tube, an agitator and a nitrogen introduction tube, and were caused to react in a flow of nitrogen at 230° C. for 8 hours with dehydration. Subsequently, the semi-product was caused to react under reduced pressure of 5 to 20 mmHg, and cooled to 180° C. at the point of time when the acid value became 2 or less. 73 parts of trimellitic anhydride were added to the semi-product, and the semi-product was taken out after two-hour reaction at 180° C. under sealing at nomal pressure, cooled to room temperature and pulverized to provide particles of polyester (B6).

Polyester (B6) contained no THF-insoluble component, and was substantially linear with the softening point of 99° C., acid value of 41, hydroxyl value of 45, Tg of 68° C., number-average molecular weight of 2000 and weight-average molecular weight of 4900.

[Synthesis of Toner Binder]

400 parts of polyester (A6) and 600 parts of polyester (B6) were mixed in molten state in a continuous kneader at a jacket temperature of 150° C. for 1 minute of retention time. The melted resin was cooled to room temperature and then pulverized by a pulverizer to provide particles of a toner binder (6) of the invention.

The toner binder (6) contained a THF-insoluble component of 20% and had the acid value of 29, hydroxyl value of 35, Tg of 64° C., and the THF-soluble component had the weight-average molecular weight of 16000. 20 in number among twenty measured values of weight-average molecular weight every one toner binder particle were between 5640 and 28000, which satisfy the above-mentioned relationship (1-3).

EVALUATION EXAMPLES-4–6 AND COMPARATIVE EVALUATION EXAMPLES-2, 3

8 parts of carbon black MA-100 (manufactured by Mitsubishi Chemical Co., Inc.), 5 parts of carnauba wax and 1 part of charge control agent T-77 (manufactured by Hodogaya Chemical Co., Ltd.) were added to 100 parts of the toner binders (4) to (6) of the invention and the comparative toner binders (C2), (C3) to form toner in the same manner as in Evaluation example 1 to provide toner particles having a particle size d50 of 9 $\mu$m. Subsequently, a sample mill was used to mix 0.3 parts of colloidal silica (aerosil R972: manufactured by Nippon Aerosil Co., Ltd.) with 100 parts of toner particles to provide toners (4) to (6) and comparative toners (C2), (c3).

TABLE 2 shows results of evaluation.

TABLE 2

| Toner No. | MFT | HOT | Pigment dispersibility |
|---|---|---|---|
| toner (4) | 140° C. | 230° C. | ○ |
| toner (5) | 170° C. | 240° C. or more | ○ |

TABLE 2-continued

| Toner No. | MFT | HOT | Pigment dispersibility |
|---|---|---|---|
| toner (6) | 135° C. | 240° C. | ○ |
| comparative toner (C2) | 145° C. | 220° C. | x |
| comparative toner (C3) | 150° C. | 180° C. | Δ |

[Method of Evaluation]

[1] Minimum Fixing Temperature (MFT)

A fixing device of a commercially available duplicator (AR5030: manufactured by Sharp Corporation) was used to evaluate a non-fixing image developed by the duplicator. A fixing roll temperature, at which a image density remaining percentage after rubbing of a fixed image by a pad became at least 70%, was made a minimum fixing temperature.

[2] Hot Offset Generating Temperature (HOT)

Like the above MFT, evaluation of fixing was made, and the existence of hot offset on a fixed image was evaluated visually. A fixing roll temperature, at which hot offset was generated, was made an hot offset generating temperature.

[3] Pigment Dispersibility

A dielectric loss tangent (tan δ) of toner was measured to provide an index of pigment dispersibility.

Criterion ○: tan δ: 10 or less

Δ: tan δ: 10 to 30 x: tan δ: 30 or more

Condition of measurement of dielectric loss tangent

Apparatus: TR-1100 type dielectric loss measuring apparatus manufactured by Ando Electric Co., Ltd.

Electrode: SE-43 type powder electrode manufactured by Ando Electric Co., Ltd.

Measurement frequency: 1 kHz

The toner binders (4), (5) and (6) forming the toners (4), (5), (6) were mixtures of two polyesters, differences in softening point between which were 63° C., 63° C. and 72° C., respectively, and provided toners having a low-temperature fixing property and anti-hot offset property. On the other hand, the comparative toner (C2) lacked the mixing process, in which (A) and (B) were melted, and was high in minimum fixing temperature, low in hot offset generating temperature and poor in pigment dispersibility as compared with the toner (4). Further, the comparative toner (C3) involves excessive melting time in the toner binder mixing process, and was high in minimum fixing temperature, low in hot offset generating temperature and poor in pigment dispersibility as compared with the toner (5). It is presumed that reaction of ester interchange was generated between polyesters (A) and (B) in the toner binder melting operation.

The toner binder according to the invention takes effect as follows:

1. Excellent in both low-temperature fixing property and anti-hot offset property
2. Excellent in pigment dispersibility and charging property

INDUSTRIAL APPLICABILITY

As described above, the toner binder according to the invention is useful as a component of a dry toner. Also, a method of manufacturing a toner binder, according to the invention, is useful for manufacture of a binder resin for a dry toner.

What is claimed is:

1. A toner binder which comprises an aggregate of binder resin particles composed of two polyesters (A) and (B), wherein (A) is higher in softening point than (B), and (A) and (B) are uniformly mixed in the particles, and at least 10 particles among 20 particles constituting the aggregate satisfy the following relationship (1—1):

$$MwA\times 0.95 \geqq MwT \geqq MwB\times 1.05 \quad (1—1)$$

wherein MwT indicates a weight-average molecular weight of a THF-soluble component in the toner binder particles, MwA a weight-average molecular weight of a THF-soluble component in (A), and MwB a weight-average molecular weight of (B).

2. A toner binder which comprises an aggregate of binder resin particles composed of two polyesters (A) and (B), wherein (A) is higher in softening point than (B), both (A) and (B) have no THF-insoluble component, a ratio (MwA/MwB), wherein MwA indicates a weight-average molecular weight of (A), MwB a weight-average molecular weight of (B), is at least 1.5, and (A) and (B) are uniformly mixed in the particles.

3. The toner binder according to claim 2, wherein WA weight % of (A) in the toner binder, WB weight % of (B) in the toner binder, MwA, MwB, and MwT satisfy the following relationship (2):

$$MwT\times(WA+WB)/(MwA\times WA+MwB\times WB) \geqq 0.8 \quad (2)$$

wherein MwT indicates a weight-average molecular weight of a THF-soluable component in the toner binder particles.

4. The toner binder according to claim 2, which has a ratio (MnA/MnB) of at least 1.5 wherein MnA indicates a number-average molecular weight of (A), MnB a number-average molecular weight of (B).

5. The toner binder according to claim 2, wherein (A) is a substantially linear polyester and MwA is at least 20,000.

6. The toner binder according to claim 3, wherein a ratio of WA to WB is 50:50 to 10:90.

7. The toner binder according to claim 2, which is for use in a color toner.

8. A toner binder which comprises an aggregate of binder resin particles composed of two polyesters (A) and (B), wherein (A) is higher in softening point than (B), and (A) and (B) are uniformly mixed in the particles, (A) contains a THF-insoluble component, (B) is a polyester containing no THF-insoluble component, and wherein a ratio of a weight % of (A) to a weight % of (B) in the toner binder is 49:51 to 25:75, and a weight % of a THF-insoluble component of the toner binder satisfies the following relationship (3):

$$TT/(TA\times WA/100) \geqq 0.8 \quad (3)$$

wherein TT indicates a weight % of a THF-insoluble component of the toner binder TA a weight % of the THF-insoluble component of (A), and WA a weight % of (A) in the toner binder.

9. The toner binder according to claim 8, wherein the THF-insoluble component of (A) is at least 15 weight %.

10. The toner binder according to claim 8, wherein (A) has the softening point of 131° C. or higher.

11. The toner binder according to claim 8, wherein (A) has the acid value of 8 to 30.

12. The toner binder according to claim 8, wherein (A) is a polyester composed of a trivalent polyol component and/or a trivalent polycarboxylic acid component, a dicarboxylic acid component, and a diol component.

13. The toner binder according to claim 8, wherein MwB which indicates a weight-average molecular weight of (B) is at most 20,000.

14. The toner binder according to claim 8, wherein (A) is a polyester composed of a polycondensate of a polyol component and a polycarboxylic acid component, and content of trivalent or higher polycarboxylic acid or anhydride thereof in the polycarboxylic acid component is 10 to 40 molar %, and wherein the acid value of (A) satisfies the following relationship (4):

$$-10 \leqq AVA-[WPA \times (XPA-2) \times 561/MPA] \leqq 10 \quad (4)$$

wherein AVA indicates the acid value of (A), WPA content (weight %) of trivalent or higher aromatic polycarboxylic acid or anhydride thereof in (A), MPA an average molecular weight of trivalent or higher aromatic polycarboxylic acid or anhydride thereof, and XPA an average valence of trivalent or higher aromatic polycarboxylic acid or anhydride thereof in (A).

15. The toner binder according to claim 2, wherein (B) is a polyester composed of a polycondensate of a polycarboxylic acid component and a polyol component, and content of trivalent or higher polycarboxylic acid or anhydride thereof in the polycarboxylic acid component is 3 to 30 molar %, and wherein a molecular weight distribution (Mw/Mn) of (B) is 1.8 to 4.

16. The toner binder according to claim 15, wherein the acid value of (B) satisfies the following relationship (5):

$$-10 \leqq AVB-[WPB \times (XPB-1) \times 561/MPB] \leqq 15 \quad (5)$$

wherein AVB indicates the acid value of (B), WPB content (weight %) of trivalent or higher aromatic polycarboxylic acid or anhydride thereof in (B), MPB an average molecular weight of trivalent or higher aromatic polycarboxylic acid or anhydride thereof, and XPB an average valence of trivalent or higher aromatic polycarboxylic acid or anhydride thereof in (B).

17. The toner binder according to claim 2, which is obtained by mixing two polyesters (A) and (B) in molten state at 80 to 180° C.

18. The toner binder according to claim 17, wherein at the time of mixing in molten state a period of time, which elapses from the start of mixing of the two polyesters until the mixed polyester is cooled to 60° C. or lower, is 10 seconds to 40 minutes.

19. The toner binder according to claim 17, wherein the mixing in molten state is performed by the use of a continuous type mixing apparatus.

20. The toner binder according to claim 8, which is obtained by mixing two polyesters (A) and (B) in molten state at 80 to 180° C.

* * * * *